Nov. 30, 1965  L. HODAK  3,220,624
CAR TOP CARRIER FOR AUTOMOBILES
Filed Dec. 2, 1963  2 Sheets-Sheet 1
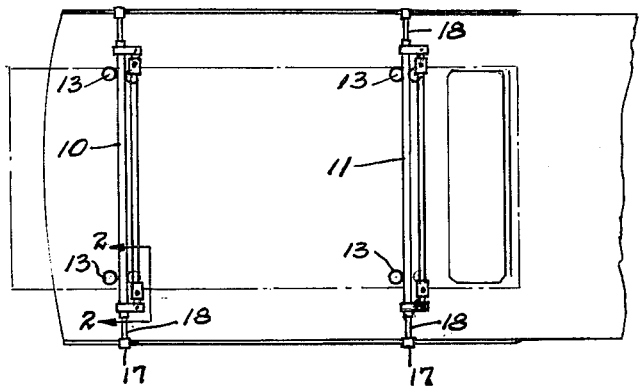
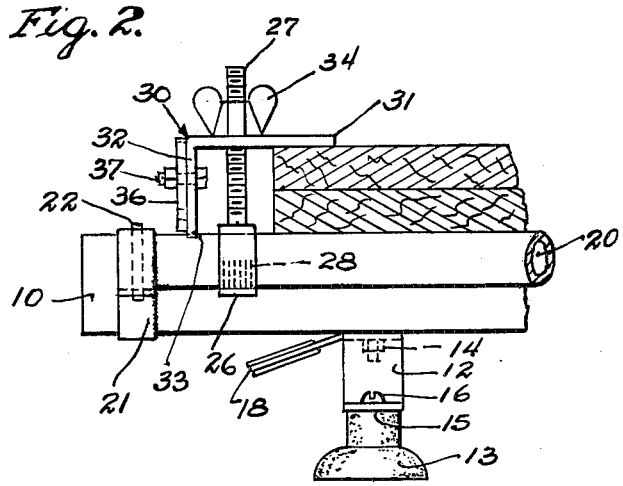
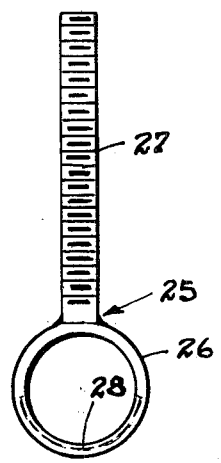
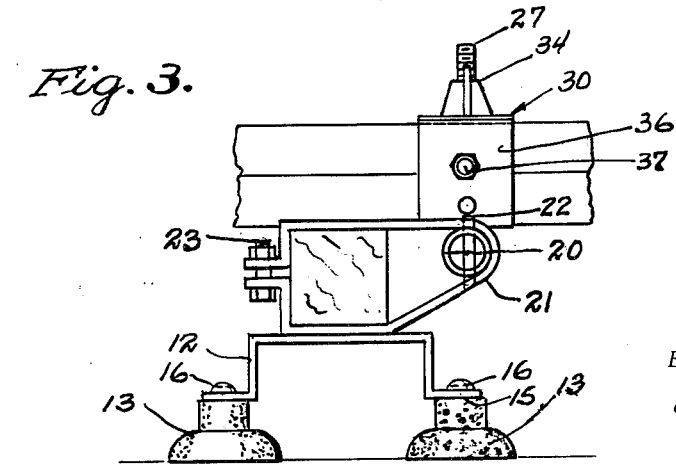
INVENTOR.
LOUIS HODAK
BY
ATTORNEY.

Nov. 30, 1965    L. HODAK    3,220,624
CAR TOP CARRIER FOR AUTOMOBILES
Filed Dec. 2, 1963    2 Sheets-Sheet 2
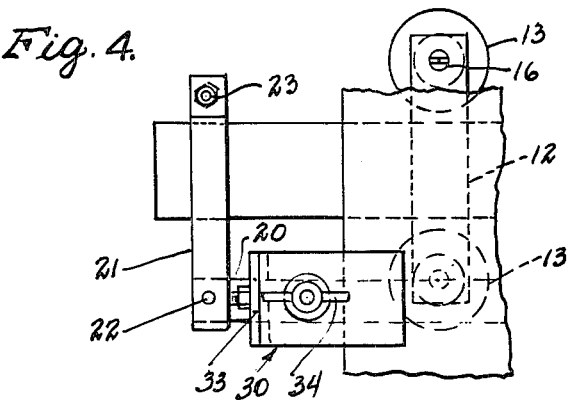
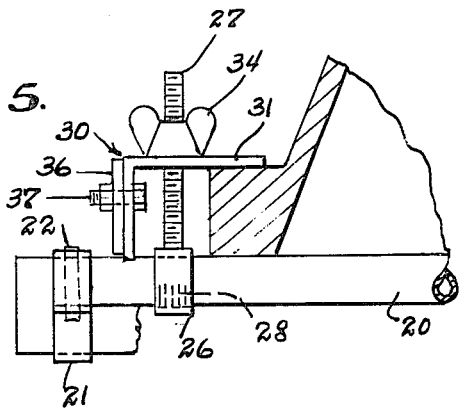
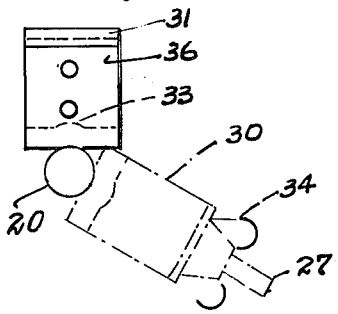
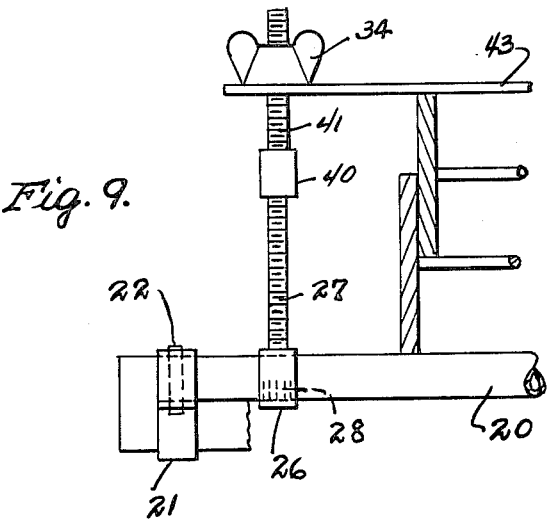
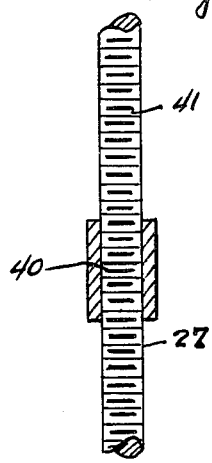
INVENTOR.
LOUIS HODAK
BY Louis J. Letterle
ATTORNEY.

3,220,624
CAR TOP CARRIER FOR AUTOMOBILES
Louis Hodak, Middlesex Township, Butler County, Pa.
Filed Dec. 2, 1963, Ser. No. 327,284
3 Claims. (Cl. 224—42.1)

This invention relates generally to a carrier designed to be applied to the top of an automobile and it has particular relation to a car top carrier for moving heavy loads, such as sheets of plywood, boats, ladders or the like, together with clamping means for rigidly securing the load on the top of the carrier.

The primary object of the invention is to provide a carrier for the top of automobiles in which clamping means are embodied for engaging and securely holding a load of material thereon.

Another object of the invention is to provide a carrier having movable clamping means thereon to engage the load, such as the gunwale of a boat with both lateral and transverse pressure.

A further object of the invention is to provide a carrier having clamping means which are simple, compact, easy to construct, readily and easily operatable, together with being economical to manufacture from materials and facilities readily available. These and other objects of the invention will be apparent from the description and the drawings.

For a better understanding of the invention reference may now be had from the accompanying drawings forming a part of this specification.

FIG. 1 is a plan view of the invention combined with a fragmentary plan view of the top of an automobile, in which a carrier or support employed in transporting articles on the metal tops of automobiles is included.

FIG. 2 is a front elevational view of the invention, taken along lines 2—2 of FIG. 1.

FIG. 3 is an end view of the invention shown in FIG. 2, in which the clamping means are shown mounted to the car top carrier or support.

FIG. 4 is a plan view of the invention shown in FIGS. 2 and 3, in which the clamping means are shown mounted on the carrier or support.

FIG. 5 is a front elevational view of the invention showing the clamping means employed in connection with the securing of a gunwale of a boat.

FIG. 6 is a detail view of a portion of the means employed in securing a load of material to the car top of an automobile according to the invention.

FIG. 7 is a fragmentary front view of the invention showing position of hold down member in relation with tube member.

FIG. 8 is an end view of the invention, shown in FIG. 7 with the device shown in dot and dash lines when device is not in use.

FIG. 9 is a fragmentary front view of the invention mounted on a car top of an automobile, when the device is employed to secure bulky loads, such as a ladder.

FIG. 10 is a detail view of a connection used in the invention, shown in FIG. 9.

Heretofore, it has been quite an enterprise to haul bulky loads, such as plywood, boats, ladders or the like on the top of an automobile because no satisfactory means to rigidly secure the load to the top of the automobile were available. It is true that some devices for doing this work were available, but it is likewise true that they were very unsatisfactory because they were complicated in the structure and expensive to purchase. With the present invention these difficulties have been overcome. In the present invention a car top support, firmly mounted on the roof of an automobile, one that is simple in construction is provided. This support formed with a front transverse bar and a rear transverse bar is provided with each of the transverse bars, adjacent the ends thereof being provided with a pair of brackets to which is rigidly secured a round bar or steel tubing, of the thin wall type. The tubing is of a length slightly less than that of the bars. Mounted on the tubing are two clamping members, formed to securely hold heavy loads of material in position. The clamping members or devices are each formed with a collar slidably mounted on the tubing, the collar having secured thereon a threaded member or stud bolt on which is positioned a clamping or hold down angle having a horizontal leg for engaging the load to be carried and a vertical flange, with an adjusting member bolted thereon for engaging the tubing.

Referring to the drawings and more particularly to FIG. 1, it will be seen that the present invention is illustrated as combined with that type of support or carrier adapted to be mounted and secured on the metal top of automobiles or the like. In the construction illustrated, the carrier support comprises a front transverse bar 10 and a rear transverse bar 11. These bars may be constituted of any material and while I have shown them to be formed of wood, it is to be understood that they may be made of steel in the form of inverted channels. They may be supported on and attached to the top of the car in any convenient manner. In the embodiments of the invention illustrated they are attached to the top of the car and securely supported thereon by means of inverted U-shaped brackets 12 and suction cups 13. The bottom of the transverse bars 10 and 11 rest on the body portions of the brackets 12 and they are rigidly secured thereto by bolts and nuts 14, FIG. 2. The legs of the brackets 12 extend outwardly at their lower ends, as at 15 and they are securely fastened as at 16 to the necks of vacuum cups 13. Of course, the support may be otherwise constituted but to form it in the manner described is particularly advantageous for transporting heavy, bulky and unwieldy objects on the top of automobiles.

To further insure the retention of the transverse bars 10 and 11 in proper position on the car top, hook means 17 is provided at each end of each of the transverse bars 10 and 11. The hook means is secured beneath the rain gutters of the automobile and they are connected by adjustable and flexible straps 18, to slotted attaching strips 19 fastened to the bars 10 and 11, by means of the same bolts 14 that secure the bars to the brackets 12.

A clamping device for securely carrying a load of material on the top of a car is rigidly mounted on each of the bars 10 and 11, in spaced relation with the bars. A tubular member 20 secured adjacent its ends to brackets 21 by means of pins 22 is provided. The brackets 21 are rigidly mounted on the bars 10 and 11, adjacent the ends of the bars by means of bolts and nuts 23. While I have shown the brackets 21 to be formed of bar steel, bent to conform with the shape of the bars 10 and 11 and of the tube 20, it is to be understood that various forms of brackets may be employed without changing the scope of the invention. Eye members 25 are slidably mounted on the tube members 20 and since the structure of these members are the same, I shall describe the structure and operation of only one of them. Each of the members 25 formed of a collar 26 slidably mounted on the tube 20 is provided with a threaded or bolt member 27, welded or otherwise secured to the collar. Knurling or serrations 28 are provided on the inside of the collar, as indicated in FIG. 6, for the purpose as will hereinafter be described. It will be noted that the top of the member 20 is parallel with and level with the top of the bars 10 and 11 so that the load on the roof is substantially carried by the bars 10 and 11.

Hold down members for rigidly securing the load in position is provided in the form of angles 30 having a horizontal leg 31 for engaging the load and a vertical leg 32. The bottom edge of the vertical leg 32 has a curved portion 33, best shown in FIG. 8, for providing a surface engagement with the tube 20 in place of a point contact if the edge of the leg were straight. Thumb nuts screwed down on the bolt portion 27, of the member 25, hold the load securely in position. As shown in the drawings, the hold down member or angle is so formed that the vertical leg 32 is of a length that permits rigid clamping of the load and still provides engagement of the vertical leg with the tube 20. To maintain this relation of the horizontal leg with the load and the vertical leg with the tube, washers or shims may be placed between the load and the horizontal leg, should the height of the load be less than shown in the drawings. Should the load be of a height greater than that which will permit a bearing of edge portion 33 on the tube 20 a plate 36 secured to the vertical leg 32, by means of bolts 37 is provided, FIG. 7. The plate 36 is also provided with a curved edge portion 33 similar to the portion on the vertical leg 32, for surface engagement with the tube 20 rather than a point contact therewith. Ordinarily, the plate 36 is maintained in the position shown in FIGS. 2 to 4, but when employed for higher loads the plate is reversed and assumes the position shown in FIG. 7. It will be understood that the length of the plate 36 may be increased to permit the securing of loads of greater height.

In FIG. 9 is shown a clamping means, as applied to a bulky load of material, such as a ladder. In this it will be noted that the member 27 is too short to be employed and requires a member of greater length. To accomplish this, a coupling nut 40 is threaded onto the member 27, about one-half the length of the nut is provided with a stud bolt 41 screwed into the remainder of the nut 40 for providing an extension for the bolt portion 27. A bar 43 extending from one member 25 to the other member on the tube 20 is provided to securely hold down the load, as shown. This is accomplished by screwing down the thumb nut 34 into engagement with bar 43.

In operation, two members 25 are slidably mounted on each of the tubes 20. The tubes are then rigidly secured to the bars one to bar 10 and one to bar 11. The clamping device is completed, then when the clamping device is not in use, it usually assumes the position shown in FIG. 8. When a load is positioned on the supports 10 and 11, the clamping device is moved in position along the tubes 20 and bolted in position, to rigidly secure the load to be hauled. It is essential that the top of the tubes are maintained level with the top of the roof supports 10 and 11, so that substantially all of the load is carried by the supports. The knurling 28 is formed to provide a secure biting action on the tube 20 when the clamping member is securely bolted in position.

From the foregoing it is apparent that I have provided a new and novel device, simple, easy to construct and readily and easily operable, a device new to the art and economical to manufacture.

It is to be understood that the form of the invention herewith described and shown is merely illustrative of the invention in its preferred embodiment and that such changes as fall within the purview of one skilled in the art may be made without departing from the spirit of the invention or the scope of the appended claims.

What I claim:

1. The combination with a car top carrier for automobiles having a front and rear transverse bar extending across the car top comprising a tubular member mounted on brackets adjacent the ends thereof, the brackets rigidly secured to the bar with the top of the tubular member level with and spaced from the top of the bar, clamping means formed with a collar slidably mounted on the tubular member, said collar terminating in a threaded member extending from the collar, an angle member having a flange engaging the tubular member with the other flange positioned on the load when load is in position to be carried and a locking element on the threaded member for securing the load in position.

2. The combination with a car top carrier for automobiles having a front and rear transverse bar extending across the car top comprising a pair of brackets mounted on the bar adjacent the ends thereof, a tubular member mounted on the brackets, the tubular member positioned outwardly from and in spaced relation with the bar the top of the tubular member positioned level with the top of the transverse bar, a pair of eye bolts slidably mounted on the tubular member, hold down means mounted on the eye bolt for engaging the load to be carried and locking means threaded on the eye bolt for rigidly securing the load in position.

3. The combination with a car top carrier for automobiles having a front and rear transverse bar extending across the car top comprising a pair of brackets mounted on the bar adjacent the ends thereof, a tubular member mounted on the brackets, the tubular member positioned outwardly from and in spaced relation with the bar, means formed with a collar slidably mounted on the tubular member, a threaded member secured to and extending from the collar, an angle member positioned on the threaded member for engaging both the tubular member and the load to be carried when load is in position and means engaging the angle for locking the load to be carried in position.

References Cited by the Examiner

UNITED STATES PATENTS

| 2,434,826 | 1/1948 | Wubben | 224—42.1 |
| 2,583,877 | 1/1952 | Peyron | 269—243 |
| 2,746,628 | 5/1956 | Neyra | 224—42.1 |

FOREIGN PATENTS

| 782,775 | 3/1935 | France. | |

GERALD M. FORLENZA, *Primary Examiner.*

HUGO O. SCHULZ, *Examiner.*